(12) United States Patent
Midali et al.

(10) Patent No.: US 8,740,204 B2
(45) Date of Patent: Jun. 3, 2014

(54) PIN FOR POSITIONING OF PARTS MADE OF COMPOSITE MATERIAL

(75) Inventors: Alberto Midali, Sesto Calende (IT); Agnellini Elio, Suno (IT)

(73) Assignee: Alenia Aermacchi, S.p.A., Venegono Superior (VA) (IT)

( * ) Notice: Subject to any disclaimer, the term of this patent is extended or adjusted under 35 U.S.C. 154(b) by 10 days.

(21) Appl. No.: 13/051,820

(22) Filed: Mar. 18, 2011

(65) Prior Publication Data

US 2011/0227266 A1    Sep. 22, 2011

(30) Foreign Application Priority Data

Mar. 22, 2010    (IT) ............... TO2010A0218

(51) Int. Cl.
*B23Q 1/00*    (2006.01)
*F16B 13/04*    (2006.01)

(52) U.S. Cl.
USPC .............................. 269/47; 411/34

(58) Field of Classification Search
USPC ............. 269/296, 3, 6, 95; 29/244, 253, 271, 29/83.5, 527.1; 411/902, 903, 908, 395, 411/481; 264/328.1
See application file for complete search history.

(56) References Cited

U.S. PATENT DOCUMENTS

| 4,687,398 | A |   | 8/1987 | Berecz |
| 5,630,977 | A | * | 5/1997 | Catalanotti et al. ........... 264/318 |
| 5,690,454 | A | * | 11/1997 | Smith .............................. 411/30 |
| 7,059,815 | B2 | * | 6/2006 | Ando et al. ..................... 411/34 |

FOREIGN PATENT DOCUMENTS

| DE | 200 22 001 | 4/2001 |
| EP | 2 058 111 | 5/2009 |
| GB | 827795 | 2/1960 |
| GB | 1 322 497 | 7/1973 |

OTHER PUBLICATIONS

Machine Translation of Patent DE 200 22 001 U 1 by Michael Reichard.*

* cited by examiner

*Primary Examiner* — Lee D Wilson
*Assistant Examiner* — Nirvana Deonauth
(74) *Attorney, Agent, or Firm* — Merchant & Gould P.C.

(57) ABSTRACT

A pin for the production and positioning of parts made of composite material and glued together in an aircraft, the pin including an elongated body (1), which is inserted in the holes purposely provided on parts of the aircraft or of the assembly jig. The pin also includes a head (2) that limits insertion of the pin in the holes, the body and the head being integrated in a single body made of a thermoplastic material. The process of production of the pin is a molding process.

6 Claims, 1 Drawing Sheet

PIN FOR POSITIONING OF PARTS MADE OF COMPOSITE MATERIAL

This application claims benefit of Serial No. TO 2010 A 000218, filed 22 Mar. 2010 in Italy and which application is incorporated herein by reference. To the extent appropriate, a claim of priority is made to the above disclosed application.

BACKGROUND

The present invention relates to pins for the positioning and production of parts made of composite material and glued together used in tools for lamination and gluing of aircraft parts.

Tools for production of parts made of composite materials or glued together for aircraft are substantially cradles that contain the various parts of an group during the assembly step of a group itself. Said cradles form seats for precise positioning of the various parts so as to favour proper constraint thereof to the other parts of the group itself resting on the cradle.

It is known that in a cradle in which a part of an aircraft is housed both in the assembly step and for checks for setting-up and routine monitoring of the aircraft, pins are used for positioning and provisionally fixing loose or pre-assembled parts of the aircraft both during the assembly step and during setting-up of the aircraft itself.

The pins are inserted into purposely provided holes arranged in key points of the parts where a temporary fixing is necessary. During the step of production of parts made of composite materials, the pins create, where they are positioned, holes for future references for the assembly step on subsequent frames for assembly of the aircraft itself.

The pins notoriously comprise two parts: a cylindrical body and a head. According to the known art the aforesaid pins are made of resistant materials of a metal type or a plastic type, for example Teflon, and the process for the production of said pins comprises, amongst other things, a step of turnery of the aforementioned materials.

As known to the person skilled in the art, said step of the process entails very long and costly production times.

Furthermore, the use of metal materials for making said pin can damage the structure of the aircraft when the pin is totally inserted into the holes, because of relative movements between the structures of the frame or else on account of an incorrect insertion of the pin into the hole by the operator.

It should moreover be emphasized that said pins are used for fastening materials with different physical characteristics.

During the steps of polymerisation, usually hot polymerisation, with a thermal delta even of 170° C., different degrees of thermal expansion are produced between the various components or between the components of aircraft structures and the polymerisation cradles, according to their own coefficients of thermal expansion, which put said pins to non-negligible forces, due to the relative movements between the parts or between the parts and the equipment.

Said forces can also cause deformation of the engagement hole with consequent deformation also of said pins, making them difficult to extract and no longer further usable.

As in the production of an aircraft said pins are used in a wide range of production steps, the aforementioned problem leads to an increase in the costs caused, very frequently, by the unusability of pins already adopted in the previous steps of production of the component and of the aircraft itself.

Extraction of said pins, once they have been inserted into the reference holes, is complex and can be at times particularly difficult, and in some cases can lead indirectly to damage of the tool itself.

The known art does not provide a satisfactory solution and, it is necessary to rely only upon the experience of the operators for carrying out said operation.

SUMMARY

The purpose of the present invention is to overcome said drawbacks by creating a new type of disposable pin made of reinforced thermoplastic material obtained using a die that enables a very fast, reliable, and low-cost production process.

The use of a thermoplastic material moreover enables said pin to undergo deformation according to the deviations of the hole in which it is inserted. The low cost of said pins means that it is no longer necessary to be concerned either upon the possible deformations undergone during its use or upon extraction of the pin itself.

Said new solution moreover enables application of a new method for facilitating extraction of said new pins after their use on frames by creating a hole within said pin.

One aspect of the present invention regards a pin for positioning of glued parts and composite parts.

BRIEF DESCRIPTION OF THE DRAWINGS

The characteristics and advantages of said pin will emerge more clearly and evidently from the ensuing description of an embodiment thereof, with reference to the attached figures, wherein specifically.

DETAILED DESCRIPTION

Figure 1:
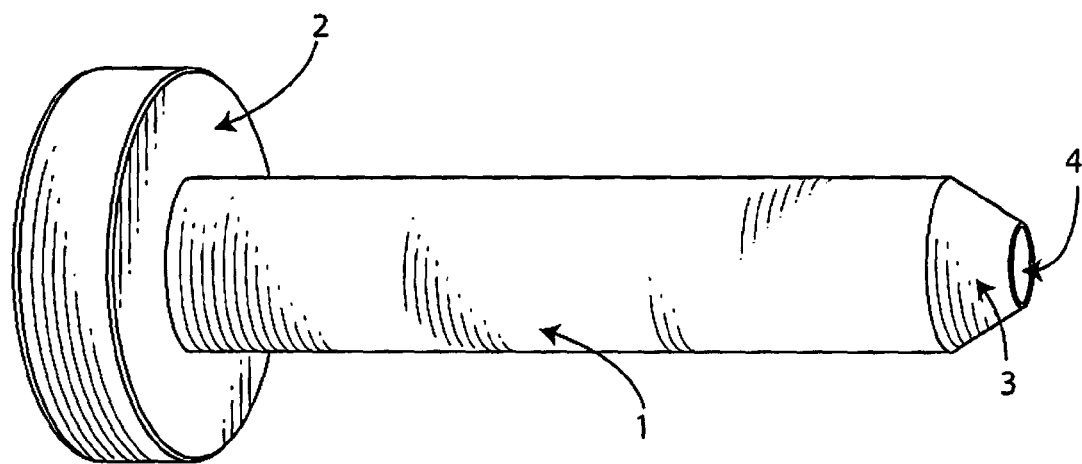
FIG. 1 is a perspective view of a pin according to the present invention.
Figure 2:
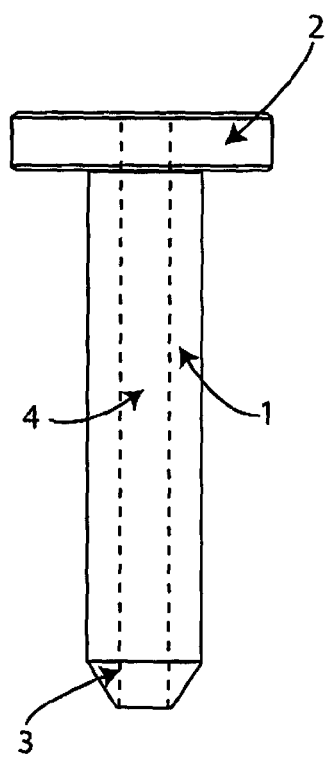
FIG. 2 shows the pin of FIG. 1 in a longitudinal section.

With reference to the aforesaid figures, the present invention regards a disposable pin made of reinforced thermoplastic material, which comprises an elongated, preferably cylindrical, body 1, which is inserted into the holes purposely provided on the parts of the aircraft or of the assembly jig, and a head 2, which limits insertion of the pin in the aforesaid holes.

In the embodiment illustrated, the pin comprises the aforesaid cylindrical body 1 and head 2, made of one and the same material and obtained with a single production process. The pin as a whole is traversed longitudinally by a through hole 4.

Elongated body 1 is adapted to be inserted into the holes for positioning the parts during assemblage of the aircraft.

Provided in the bottom part of elongated body 1 is a tapering 3, for facilitating insertion of the pin within the purposely provided holes.

Head 2 positioned in the top part of body 1 has its ends chamfered so as not to ruin the parts of the aircraft that are to be assembled. In the stage of production of the parts made of composite material, after removal of the cylindrical body, head 2 reinforces the seat of the hole. Through hole 4 is positioned along the vertical axis, centred with respect to the axis of the pin.

Said hole 4 is adapted to facilitate extraction of said pin.

It should be emphasized how the method for production of the pins by turning according to the known art does not enable a hole 4 to be made directly in the pin, other than at sustained costs, unlike the mold method used by the present invention.

The material of which the pin is made is a thermoplastic material or else equivalent materials with which said pin can be obtained with a molding process, in particular injection molding.

To render said production process even more advantageous, it may be added for information purposes that it is expedient to use thermoplastic materials adapted for the aforementioned applications but with not excessively high melting points.

The dimensions of the cylindrical body, of the head, and of the hole are dictated by the standards for such a pin according to the parts that are to be provisionally fixed using said pin.

The injection-molding technique enables creation of a large number of pins simultaneously with a low cost and at a high speed, maintaining the reliability of the pin itself unaltered.

To facilitate extraction of the pin from the hole after its use, the aforesaid through hole 4 is created, but it is possible to obtain an advantage for extraction also from a simple non-through hole.

The method of extraction used consists in cleaning the hole in which the pin is inserted via a drill of adequate size, without any damage to the parts of the aircraft.

With said method the technical problem of extraction of the pin when it is deformed and cannot be extracted in a simple way is solved.

The function of said hole is hence that of guide for the drill that is to clean said hole and to reduce the amount of material used for the production of the pin, and as the diameter thereof is varied the co-operating section of the pin itself varies accordingly.

The method for cleaning the hole in which the pin is inserted can be obtained with systems equivalent to what has just been described.

Tapering 5 can be more or less accentuated according to the requirements of use of said pin.

The shape of head 3 described is circular in shape but it may have a different shape, for example, in compliance with the standards ISO 261 and ISO 262 for bolts.

The invention claimed is:

1. A method of using a disposable pin for production and positioning and assembling of parts made of composite material glued together for an aircraft or an assembly jig, the pin including an elongated body and a head integrated as a single element made of reinforced thermoplastic material and produced in a single molding step; said method comprising: creating holes on the parts for the aircraft or the assembly jig; inserting the elongated body of the pin in one of the holes so that the head of the pin touches one of the parts of the aircraft or the assembly jig; polymerizing the parts of the aircraft or the assembly jig with a thermal delta; extracting said pin from the one of the holes with a drill and cleaning the one of the holes; wherein the pin defines a through-hole along a vertical axis of the pin facilitating extraction of the pin, and wherein during extracting said pin, the body of said pin reinforces a seat of the corresponding one of the holes in the part of the aircraft; the pin collapsing transversely, from external shearing loads applied to the pin, in order to safeguard structural integrity of the parts and of the aircraft.

2. The method according to claim 1, wherein the molding process is a process of injection molding.

3. The method according to claim 1, wherein the hole is created during the process of production of the pin.

4. The method according to claim 1, wherein a bottom part of the elongated body is tapered.

5. The method according to claim 1, wherein the elongated body is cylindrical.

6. The method according to claim 1, wherein the elongated body and the head comprise a monolithic element.

* * * * *